United States Patent
Lin (10) Patent No.: US 10,303,600 B2
(45) Date of Patent: May 28, 2019

(54) METHOD AND STORAGE DEVICE FOR COLLECTING GARBAGE DATA

(71) Applicant: Huawei Technologies Co., Ltd., Shenzhen (CN)

(72) Inventor: Chungong Lin, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 373 days.

(21) Appl. No.: 14/983,211

(22) Filed: Dec. 29, 2015

(65) Prior Publication Data

US 2016/0132429 A1    May 12, 2016

Related U.S. Application Data

(63) Continuation of application No. PCT/CN2014/074797, filed on Apr. 4, 2014.

(30) Foreign Application Priority Data

Nov. 14, 2013  (CN) .......................... 2013 1 0573861

(51) Int. Cl.
*G06F 12/02* (2006.01)
*G06F 3/06* (2006.01)

(52) U.S. Cl.
CPC ........ *G06F 12/0261* (2013.01); *G06F 3/0619* (2013.01); *G06F 3/0665* (2013.01);
(Continued)

(58) Field of Classification Search
CPC ............... G06F 12/0253; G06F 12/023; G06F 12/0261; G06F 3/0619; G06F 3/0665; G06F 3/0689; G06F 12/0238
See application file for complete search history.

(56) References Cited

U.S. PATENT DOCUMENTS

2002/0054603 A1* 5/2002 Musoll ................ G06F 9/30003
370/412
2008/0172431 A1* 7/2008 Stephens ............... G06F 9/4843
(Continued)

FOREIGN PATENT DOCUMENTS

CN        101281458 A        10/2008
CN        102799535 A        11/2012
(Continued)

OTHER PUBLICATIONS

Machine Translation and Abstract of Japanese Publication No. JP2013214201, dated Oct. 17, 2013, 24 pages.
(Continued)

*Primary Examiner* — Amanda L Willis
*Assistant Examiner* — Vaishali Shah
(74) *Attorney, Agent, or Firm* — Conley Rose, P.C.

(57) ABSTRACT

A method and a storage device for collecting garbage data, where the method includes separately recording a data volume of first data in each segment of a storage device at a current time and a variation of the first data in each segment of the storage device in a preset period of time before the current time; obtaining, by means of calculation, a predicted value of the first data according to the data volume of the first data in each segment and the variation of the first data in each segment; and determining, according to the predicted value of the first data in each segment, a segment whose garbage data needs to be collected. A segment that has more garbage data and whose garbage creating rate is lower is reclaimed preferentially.

18 Claims, 4 Drawing Sheets

(52) U.S. Cl.
CPC ........ *G06F 3/0689* (2013.01); *G06F 12/0238* (2013.01); *G06F 2212/1016* (2013.01); *G06F 2212/702* (2013.01); *G06F 2212/7201* (2013.01); *G06F 2212/7205* (2013.01)

(56) References Cited

U.S. PATENT DOCUMENTS

| | | | |
|---|---|---|---|
| 2009/0052530 A1* | 2/2009 | Odagiri | H04N 19/105 375/240.12 |
| 2009/0055628 A1* | 2/2009 | Mitran | G06F 9/3834 712/207 |
| 2011/0055455 A1 | 3/2011 | Post et al. | |
| 2012/0066438 A1* | 3/2012 | Yoon | G06F 12/0246 711/103 |
| 2014/0244897 A1* | 8/2014 | Goss | G06F 12/0246 711/103 |
| 2014/0281138 A1* | 9/2014 | Karamcheti | G06F 12/0246 711/103 |

FOREIGN PATENT DOCUMENTS

| | | |
|---|---|---|
| CN | 103577338 A | 2/2014 |
| JP | 60221847 A | 11/1985 |
| JP | 2005025727 A | 1/2005 |
| JP | 2006351004 A | 12/2006 |
| JP | 2013214201 A | 10/2013 |

OTHER PUBLICATIONS

Foreign Communication From a Counterpart Application, Japanese Application No. 2017-021025, Japanese Notice of Allowance dated Jan. 24, 2018, 3 pages.

Partial English Translation and Abstract of Chinese Patent Application No. CN103577338, Nov. 5, 2015, 4 pages.

Foreign Communication From a Counterpart Application, PCT Application No. PCT/CN2014/074797, English Translation of International Search Report dated Aug. 1, 2014, 2 pages.

Foreign Communication From a Counterpart Application, PCT Application No. PCT/CN2014/074797, Written Opinion dated Aug. 1, 2014, 5 pages.

Foreign Communication From a Counterpart Application, Japanese Application No. 2016-526414, Japanese Notice of Allowance dated Jan. 10, 2017, 3 pages.

* cited by examiner

METHOD AND STORAGE DEVICE FOR COLLECTING GARBAGE DATA

CROSS-REFERENCE TO RELATED APPLICATION

This application is a continuation of International Application No. PCT/CN2014/074797, filed on Apr. 4, 2014, which claims priority to Chinese Patent Application No. 201310573861.4, filed with the Chinese Patent Office on Nov. 14, 2013, both of which are incorporated herein by reference in their entireties.

TECHNICAL FIELD

The present disclosure relates to the computer field, and in particular, to a method and a storage device for collecting garbage data.

BACKGROUND

Generally, after data is written into a storage device, a corresponding address is found according to a logical block address (LBA), and then the data is written into the corresponding address. If addresses of multiple input output (IO) commands are consecutive, the multiple input output commands are sequential IOs; otherwise, the multiple input output commands are random IOs.

When a hard disk drive (HDD) in the storage device needs to read a piece of data, a magnetic head first must move to a track where the data is located, and the magnetic head moves in a radial direction to a position above a track where a target sector is located. This period of time is referred to as seek time and is about 10 milliseconds on average. After a target track is found, the target sector is rotated to a position under the magnetic head by rotating a disk sheet. This period of time is referred to as a time of a rotational latency. For a hard disk of 7200 revolutions per minute, a time required for one revolution is about 8.33 milliseconds, and an average time of rotational latencies is about 4.17 milliseconds. A time for reading data from or writing data into a target sector is about a few milliseconds. For the sequential IOs, a seek and waiting are not required between the IOs, and therefore performance of the sequential IOs is relatively high; and for the random IOs, a seek and waiting are required for each IO and a time for a seek and waiting is much longer than a time for reading or writing data, and therefore performance of the random IOs is very poor.

Generally, redundant array of independent disks (RAID) protection is used for the storage device. For a random write IO, RAID5 and RAID6 both have a write penalty, which seriously affects performance; for a sequential write IO, a write penalty is very small. 8-disk RAID5 is used as an example to describe impact of a write penalty on write performance. The 8-disk RAID5 consists of seven data disks (D) and one parity disk (P). If a small IO is randomly written, in a best case, original parity data must be read into in a memory, and new data and the original parity data are checked again to generate new parity data, then the new data and the new parity data are written into a disk. Each host IO triggers a disk IO operation for at least three times; therefore, a write is increased by 3 times and performance of an entire system deteriorates by ⅔. During a sequential write, after seven host IOs are received, the seven host IOs are checked together to generate new parity data and then the seven IOs and the new parity data are together written into a disk. Every seven host IOs trigger a disk operation for eight times, and therefore a write is increased by 8/7 times and performance deteriorates slightly.

A redirect-on-write is a full sequential write, which not only can solve a problem of poor performance of an HDD random write, but also can solve a problem of a RAID write penalty; therefore, in a case of processing a write IO, a redirect-on-write function is introduced. A physical space of a storage device is divided into a valid data space and a redundant space. The valid data space stores data that has been written. A mapping is established between a logical address of a write IO and a physical address of the valid data space. After a random write IO is delivered to a logical address, an original physical location in the valid data space is not overwritten; instead, a segment of space is allocated from the redundant space so that multiple random write IOs are sequentially written into consecutive redundant spaces; and then a mapping between the logical address and a new physical address is recorded by using a mapping table, and the original valid data physical space that has been written becomes garbage. In this way, a random write can be transformed into a full stripe sequential write, which improves write performance of the storage device.

The redirect-on-write may create garbage in the original physical space. When the redundant space is less than a specific degree, garbage collection must be enabled; otherwise, once the redundant space is used up, a new write IO cannot be processed because no redundant space is allocated. To facilitate garbage collection, the physical space of the storage device is generally divided into multiple segments according to a specific size. In a RAID scenario, a segment refers to an entire stripe; in a solid state disk (SSD) scenario, a segment refers to an erasable block; and in another scenario, a segment refers to a segment of consecutive spaces. After a system runs for a period of time, garbage may be created in each segment, and a ratio of a garbage quantity to a quantity of blocks in a segment is referred to as a garbage ratio in the segment. During garbage collection, generally, a segment in which a garbage ratio is higher is found first, and remaining valid data in this segment is migrated to a redundant space; and after the valid data in this segment is migrated, this segment may be reclaimed so that the segment becomes a redundant space for re-allocation.

In an SSD, a block consists of a page that is a minimum write unit. In the SSD, a block is a segment in which garbage data collection is performed. Before data is written into the SSD, erasing needs to be performed first, where a unit of the erasing is a block; therefore, a redirect-on-write is also used inside the SSD and garbage collection also exists. An operation process is exactly the same as the above-mentioned redirect-on-write except that a step of an erasing operation is added before the collection.

In general, redirect-on-write-based garbage collection of a storage device generally uses a garbage ratio as a collection condition. After a redundant space is insufficient, collection is performed, according value of a garbage ratio, on a segment in which a garbage ratio is higher. Valid data needs to be migrated in a garbage collection process, where the valid data needs to be read out for migration and then the valid data is written into a new address. A read IO and a write IO that are generated in this process belong to a part of a redirect-on-write function; therefore, a new IO needs to be generated in a migration process and the new IO occupies an IO resource and bandwidth of the storage device. In a common storage device, IO resources and bandwidth are limited; a lower garbage ratio in a segment indicates a greater volume of valid data that needs to be migrated in the segment and more IO resources and a higher bandwidth capability of the storage device that are occupied, which greatly affects storage device performance. In the prior art, basically, each segment is reclaimed immediately after a garbage ratio reaches a preset value, which causes low efficiency of garbage data collection.

SUMMARY

Embodiments of the present disclosure provide a method and storage device for collecting garbage data, which aim to solve a problem about how to improve efficiency of garbage collection.

According to a first aspect, a method for collecting garbage data is provided, and the method includes separately recording a data volume of first data in each segment of a storage device at a current time and a variation of the first data in each segment of the storage device in a preset period of time before the current time, where the first data is garbage data or valid data, the variation of the first data is an increment of the garbage data or a decrement of the valid data, and a value of the increment of the garbage data is the same as a value of the decrement of the valid data; obtaining, by means of calculation, a predicted value of the first data according to the data volume of the first data in each segment and the variation of the first data in each segment; and determining, according to the predicted value of the first data in each segment, a segment whose garbage data needs to be collected, where the valid data refers to data stored at a physical address that is in a segment and has a mapping relationship with a logical address, and the garbage data refers to data stored at a physical address that is in a segment and does not have a mapping relationship with a logical address.

With reference to the first aspect, in a first possible implementation manner of the first aspect, the obtaining, by means of calculation, a predicted value of the first data according to the data volume of the first data in each segment and the variation of the first data in each segment includes obtaining, by means of calculation, a predicted value of the data volume of the first data according to a first weight and the data volume of the first data in each segment; obtaining, by means of calculation, a predicted value of the variation of the first data according to a second weight and the variation of the first data in each segment; and obtaining, by means of calculation, the predicted value of the first data according to the predicted value of the data volume of the first data and the predicted value of the variation of the first data.

With reference to the first possible implementation manner of the first aspect, in a second possible implementation manner of the first aspect, the separately recording a data volume of first data in each segment of a storage device at a current time and a variation of the first data in each segment of the storage device in a preset period of time before the current time includes separately recording a data volume of garbage data in each segment at the current time and an increment of the garbage data in each segment in the preset period of time before the current time; the obtaining, by means of calculation, a predicted value of the first data according to the data volume of the first data in each segment and the variation of the first data in each segment includes obtaining, by means of calculation, a predicted value of the data volume of the garbage data at the current time according to the first weight and the data volume of the garbage data in each segment at the current time; obtaining, by means of calculation, a predicted value of a variation of the garbage data according to the second weight and the increment of the garbage data in each segment; and subtracting the predicted value of the variation of the garbage data in each segment from the predicted value of the data volume of the garbage data in each segment at the current time to obtain a predicted value of the garbage data; and the determining, according to the predicted value of the first data in each segment, a segment whose garbage data needs to be collected includes determining, in descending order of the predicted values of the garbage data, the segment whose garbage data needs to be collected.

With reference to the first possible implementation manner of the first aspect, in a third possible implementation manner of the first aspect, the separately recording a data volume of first data in each segment of a storage device at a current time and a variation of the first data in each segment of the storage device in a preset period of time before the current time includes separately recording a data volume of valid data in each segment at the current time and a decrement of the valid data in each segment in the preset period of time before the current time; the obtaining, by means of calculation, a predicted value of the first data according to the data volume of the first data in each segment and the variation of the first data in each segment includes obtaining, by means of calculation, a predicted value of the data volume of the valid data at the current time according to the first weight and the data volume of the valid data in each segment at the current time; obtaining, by means of calculation, a predicted value of a variation of the valid data according to the second weight and the decrement of the valid data in each segment; and adding the predicted value of the data volume of the valid data in each segment at the current time and the predicted value of the variation of the valid data in each segment to obtain a predicted value of the valid data; and the determining, according to the predicted value of the first data in each segment, a segment whose garbage data needs to be collected includes determining, in ascending order of the predicted values of the valid data, the segment whose garbage data needs to be collected.

With reference to the first possible implementation manner of the first aspect, in a fourth possible implementation manner of the first aspect, the separately recording a data volume of first data in each segment of a storage device at a current time and a variation of the first data in each segment of the storage device in a preset period of time before the current time includes separately recording a data volume of garbage data in each segment at the current time and a decrement of valid data in each segment in the preset period of time before the current time; the obtaining, by means of calculation, a predicted value of the first data according to the data volume of the first data in each segment and the variation of the first data in each segment includes obtaining, by means of calculation, a predicted value of the data volume of the garbage data at the current time according to the first weight and the data volume of the garbage data in each segment at the current time; obtaining, by means of calculation, a predicted value of a variation of the valid data according to the second weight and the decrement of the valid data in each segment; and subtracting the predicted value of the variation of the valid data in each segment from the predicted value of the data volume of the garbage data in each segment at the current time to obtain a predicted value of the garbage data; and the determining, according to the predicted value of the first data in each segment, a segment whose garbage data needs to be collected includes determining, in descending order of the predicted values of the garbage data, the segment whose garbage data needs to be collected.

With reference to the first possible implementation manner of the first aspect, in a fifth possible implementation manner of the first aspect, the separately recording a data volume of first data in each segment of a storage device at a current time and a variation of the first data in each segment of the storage device in a preset period of time before the current time includes separately recording a data volume of valid data in each segment at the current time and an increment of garbage data in each segment in the preset period of time before the current time; the obtaining, by means of calculation, a predicted value of the first data according to the data volume of the first data in each segment and the variation of the first data in each segment includes obtaining, by means of calculation, a predicted value of the data volume of the valid data at the current time according to the first weight and the data volume of the valid data in each segment at the current time; obtaining, by means of calculation, a predicted value of a variation of the garbage data according to the second weight and the increment of the garbage data in each segment; and adding the predicted value of the data volume of the valid data in each segment at the current time and the predicted value of the variation of the garbage data in each segment to obtain a predicted value of the valid data; and the determining, according to the predicted value of the first data in each segment, a segment whose garbage data needs to be collected includes determining, in ascending order of the predicted values of the valid data, the segment whose garbage data needs to be collected.

According to a second aspect, a storage device for collecting garbage data is provided, and the device includes a recording unit configured to separately record a data volume of first data in each segment at a current time and a variation of the first data in each segment in a preset period of time before the current time, where the first data is garbage data or valid data, the variation of the first data is an increment of the garbage data or a decrement of the valid data, and a value of the increment of the garbage data is the same as a value of the decrement of the valid data; a calculating unit configured to obtain, by means of calculation, a predicted value of the first data according to the data volume of the first data in each segment and the variation of the first data in each segment; and a determining unit configured to determine, according to the predicted value of the first data in each segment, a segment whose garbage data needs to be collected; where the valid data refers to data stored at a physical address that is in a segment and has a mapping relationship with a logical address, and the garbage data refers to data stored at a physical address that is in a segment and does not have a mapping relationship with a logical address.

With reference to the second aspect, in a first possible implementation manner of the second aspect, the calculating unit is configured to obtain, by means of calculation, a predicted value of the data volume of the first data according to a first weight and the data volume of the first data in each segment; obtain, by means of calculation, a predicted value of the variation of the first data according to a second weight and the variation of the first data in each segment; and obtain, by means of calculation, the predicted value of the first data according to the predicted value of the data volume of the first data and the predicted value of the variation of the first data.

With reference to the first possible implementation manner of the second aspect, in a second possible implementation manner of the second aspect, the recording unit is configured to separately record a data volume of garbage data in each segment at the current time and an increment of the garbage data in each segment in the preset period of time before the current time; the calculating unit is configured to obtain, by means of calculation, a predicted value of the data volume of the garbage data at the current time according to the first weight and the data volume of the garbage data in each segment at the current time; obtain, by means of calculation, a predicted value of a variation of the garbage data according to the second weight and the increment of the garbage data in each segment; and subtract the predicted value of the variation of the garbage data in each segment from the predicted value of the data volume of the garbage data in each segment at the current time to obtain a predicted value of the garbage data; and the determining unit is configured to determine, in descending order of the predicted values of the garbage data, the segment whose garbage data needs to be collected.

With reference to the first possible implementation manner of the second aspect, in a third possible implementation manner of the second aspect, the recording unit is configured to separately record a data volume of valid data in each segment at the current time and a decrement of the valid data in each segment in the preset period of time before the current time; the calculating unit is configured to obtain, by means of calculation, a predicted value of the data volume of the valid data at the current time according to the first weight and the data volume of the valid data in each segment at the current time; obtain, by means of calculation, a predicted value of a variation of the valid data according to the second weight and the decrement of the valid data in each segment; and add the predicted value of the data volume of the valid data in each segment at the current time and the predicted value of the variation of the valid data in each segment to obtain a predicted value of the valid data; and the determining unit is configured to determine, in ascending order of the predicted values of the valid data, the segment whose garbage data needs to be collected.

With reference to the first possible implementation manner of the second aspect, in a fourth possible implementation manner of the second aspect, the recording unit is configured to separately record a data volume of garbage data in each segment at the current time and a decrement of valid data in each segment in the preset period of time before the current time; the calculating unit is configured to obtain, by means of calculation, a predicted value of the data volume of the garbage data at the current time according to the first weight and the data volume of the garbage data in each segment at the current time; obtain, by means of calculation, a predicted value of a variation of the valid data according to the second weight and the decrement of the valid data in each segment; and subtract the predicted value of the variation of the valid data in each segment from the predicted value of the data volume of the garbage data in each segment at the current time to obtain a predicted value of the garbage data; and the determining unit is configured to determine, in descending order of the predicted values of the garbage data, the segment whose garbage data needs to be collected.

With reference to the first possible implementation manner of the second aspect, in a fifth possible implementation manner of the second aspect, the recording unit is configured to separately record a data volume of valid data in each segment at the current time and an increment of garbage data in each segment in the preset period of time before the current time; the calculating unit is configured to obtain, by means of calculation, a predicted value of the data volume of the valid data at the current time according to the first weight and the data volume of the valid data in each segment at the current time; obtain, by means of calculation, a predicted value of a variation of the garbage data according to the second weight and the increment of the garbage data in each segment; and add the predicted value of the data volume of the valid data in each segment at the current time and the predicted value of the variation of the garbage data in each segment to obtain a predicted value of the valid data; and the determining unit is configured to determine, in ascending order of the predicted values of the valid data, the segment whose garbage data needs to be collected.

According to the method and the storage device for collecting garbage data provided in the embodiments of the present disclosure, a data volume of first data in each segment of a storage device at a current time and a variation of the first data in each segment of the storage device in a preset period of time before the current time are separately recorded, where the first data is garbage data or valid data, the variation of the first data is an increment of the garbage data or a decrement of the valid data, and a value of the increment of the garbage data is the same as a value of the decrement of the valid data; a predicted value of the first data is obtained by means of calculation according to the data volume of the first data in each segment and the variation of the first data in each segment; and a segment whose garbage data needs to be collected is determined according to the predicted value of the first data in each segment. A segment that has more garbage and whose garbage creating rate is lower is reclaimed preferentially, thereby improving efficiency of garbage data collection.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Figure 1:
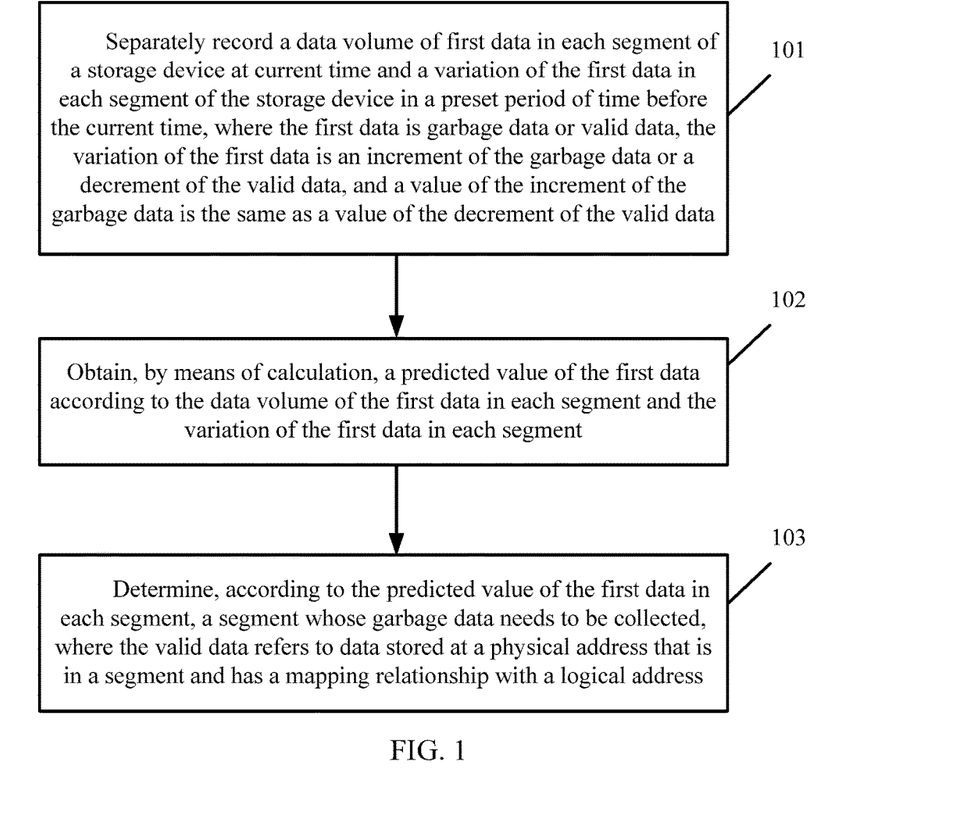
FIG. 1 is a flowchart of a method for collecting garbage data according to an embodiment of the present disclosure.

Referring to FIG. 1, FIG. 1 is a flowchart of a method for collecting garbage data according to an embodiment of the present disclosure. As shown in FIG. 1, the method includes the following steps.

Step 101: Separately record a data volume of first data in each segment of a storage device at a current time and a variation of the first data in each segment of the storage device in a preset period of time before the current time, where the first data is garbage data or valid data, the variation of the first data is an increment of the garbage data or a decrement of the valid data, and a value of the increment of the garbage data is the same as a value of the decrement of the valid data.

The valid data refers to data stored at a physical address that is in a segment and has a mapping relationship with a logical address, and the garbage data refers to data stored at a physical address that is in a segment and does not have a mapping relationship with a logical address.

In the storage device, a physical space is generally divided into multiple segments according to a specific size. In a scenario in which the storage device is a RAID, the segment refers to an entire stripe; in a scenario in which the storage device is an SSD, the segment refers to an erasable block; and in another scenario, the segment refers to a segment of consecutive spaces.

There are two data addresses in a storage device that uses a redirect-on-write, which are a logical address and a physical address. There is a mapping table between the logical address and the physical address, which is used to record a mapping relationship between the logical address and the physical address. After the storage device using the redirect-on-write receives a write IO, the write IO carries a logical address. When data is written into the logical address for the first time, a new physical address is allocated from a physical space of the storage device, the data is written into the new physical address, and a mapping relationship between the logical address and the new physical address is established in the mapping table. When data is written into the same logical address for the second time, another new physical address is allocated from the physical space, the data is written into the other new physical address, and a mapping relationship between the logical address and the other new physical address is established in the mapping table. The data stored at the other new physical address is valid data, and the data stored at the original physical address becomes garbage data. To reclaim a segment, garbage data does not need to be migrated, but only valid data needs to be migrated.

Step 102: Obtain, by means of calculation, a predicted value of the first data according to the data volume of the first data in each segment and the variation of the first data in each segment.

Optionally, the obtaining, by means of calculation, a predicted value of the first data according to the data volume of the first data in each segment and the variation of the first data in each segment includes obtaining, by means of calculation, a predicted value of the data volume of the first data according to a first weight and the data volume of the first data in each segment; obtaining, by means of calculation, a predicted value of the variation of the first data according to a second weight and the variation of the first data in each segment; and obtaining, by means of calculation, the predicted value of the first data according to the predicted value of the data volume of the first data and the predicted value of the variation of the first data.

It is assumed that the first data in each segment at the current time is garbage data, the first weight is ½, the variation of the first data in each segment is a variation of the garbage data, and the second weight is ⅓. According to a principle that a segment that has more garbage data is reclaimed preferentially, a larger product obtained by multiplying a volume of the garbage data by the first weight indicates more garbage data and less valid data in the segment, and a smaller volume of valid data to be migrated during the reclaiming, and therefore the segment is reclaimed preferentially; and a larger product obtained by multiplying a variation of the garbage data by the second weight indicates a larger increment of the garbage data in the segment, and postponed reclaiming enables more garbage to be further created in the segment, and therefore the segment is reclaimed later. In comprehensive consideration of these two factors, an expression may be:

Volume of garbage data×First weight−Variation of garbage data×Second weight.

It is assumed that the first data in each segment at the current time is valid data, the first weight is ½, the variation of the first data is a variation of the valid data, and the second weight is ⅓. According to a principle that a segment that has less valid data is reclaimed preferentially, a smaller product obtained by multiplying a volume of the valid data by the first weight indicates less valid data, and a smaller volume of valid data to be migrated during the reclaiming, and therefore the segment is reclaimed preferentially; and a smaller product obtained by multiplying a variation of the valid data by the second weight indicates a smaller increment of the garbage data, and therefore the segment is reclaimed earlier. In comprehensive consideration of these two factors, an expression may be:

Volume of valid data×First weight−Variation of valid data×Second weight.

Step 103: Determine, according to the predicted value of the first data in each segment, a segment whose garbage data needs to be collected.

Optionally, the separately recording a data volume of first data in each segment of a storage device at a current time and a variation of the first data in each segment of the storage device in a preset period of time before the current time includes separately recording a data volume of garbage data in each segment at the current time and an increment of the garbage data in each segment in the preset period of time before the current time.

The obtaining, by means of calculation, a predicted value of the first data according to the data volume of the first data in each segment and the variation of the first data in each segment includes obtaining, by means of calculation, a predicted value of the data volume of the garbage data at the current time according to the first weight and the data volume of the garbage data in each segment at the current time; obtaining, by means of calculation, a predicted value of a variation of the garbage data according to the second weight and the increment of the garbage data in each segment; and subtracting the predicted value of the variation of the garbage data in each segment from the predicted value of the data volume of the garbage data in each segment at the current time to obtain a predicted value of the garbage data.

The determining, according to the predicted value of the first data in each segment, a segment whose garbage data needs to be collected includes determining, in descending order of the predicted values of the garbage data, the segment whose garbage data needs to be collected.

Figure 2:
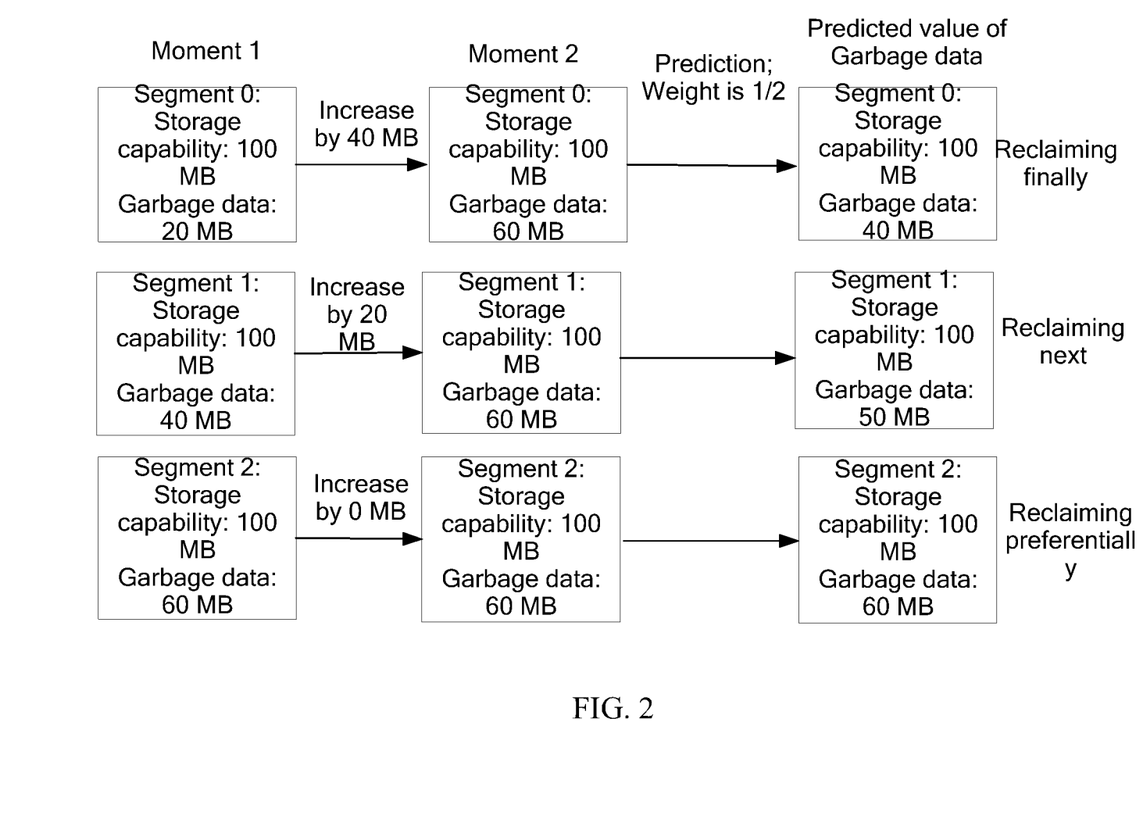
FIG. 2 is a flowchart of a method for collecting garbage data according to an embodiment of the present disclosure.

FIG. 2 is a flowchart of a method for collecting garbage data according to Embodiment 1 of the present disclosure. As shown in FIG. 2, it is assumed that there are three segments that need to be reclaimed in a storage device, where a total storage capacity of a segment 0 at a moment 1 is 100 megabytes (MB), valid data is 80 MB, and garbage data is 20 MB; a total storage capacity of a segment 1 at the moment 1 is 100 MB, valid data is 60 MB, and garbage data is 40 MB; a total storage capacity of a segment 2 at the moment 1 is 100 MB, valid data is 40 MB, and garbage data is 60 MB; a total storage capacity of the segment 0 at a moment 2 is 100 MB, valid data is 40 MB, and garbage data is 60 MB; a total storage capacity of the segment 1 at the moment 2 is 100 MB, valid data is 40 MB, and garbage data is 60 MB; and a total storage capacity of the segment 2 at the moment 2 is 100 MB, valid data is 40 MB, and garbage data is 60 MB.

It is assumed that a preset first weight is 1 and a preset second weight is ½, and then a predicted value of the garbage data in each segment is obtained by means of calculation according to an increment of the garbage data in each segment from the moment 1 to the moment 2. An increment of the garbage data in the segment 0 from the moment 1 to the moment 2 is 40 MB, and a predicted value, which is obtained by multiplying 40 MB by the weight ½, of the garbage data in the segment 0 is 20 MB; an increment of the garbage data in the segment 1 from the moment 1 to the moment 2 is 20 MB, and a predicted value, which is obtained by multiplying 20 MB by the weight ½, of the garbage data in the segment 1 is 10 MB; and an increment of the garbage data in the segment 2 from the moment 1 to the moment 2 is 0, and a predicted value of the garbage data in the segment 2 is 0.

According to the foregoing data, the predicted value of the garbage data in the segment 0 may be obtained by means of calculation according to volume of garbage data×first weight−variation of garbage data×second weight, that is, 60 MB×1−40 MB×½=40 MB; the predicted value of the garbage data in the segment 1 may be obtained by means of calculation according to volume of garbage data×first weight−variation of garbage data×second weight, that is, 60 MB×1−20 MB×½=50 MB; and the predicted value of the garbage data in the segment 2 may be obtained by means of calculation according to volume of garbage data×first weight−variation of garbage data×second weight, that is, 60 MB×1−0 MB×½=60 MB.

According to a principle that a segment whose garbage data needs to be collected is determined in descending order of a predicted value of garbage data, the garbage data in the segment 2 is collected preferentially, then the garbage data in the segment 1 is collected, and finally the garbage data in the segment 0 is collected.

Optionally, the separately recording a data volume of first data in each segment of a storage device at a current time and a variation of the first data in each segment of the storage device in a preset period of time before the current time includes separately recording a data volume of valid data in each segment at the current time and a decrement of the valid data in each segment in the preset period of time before the current time.

The obtaining, by means of calculation, a predicted value of the first data according to the data volume of the first data in each segment and the variation of the first data in each segment includes obtaining, by means of calculation, a predicted value of the data volume of the valid data at the current time according to the first weight and the data volume of the valid data in each segment at the current time; obtaining, by means of calculation, a predicted value of a variation of the valid data according to the second weight and the decrement of the valid data in each segment; and adding the predicted value of the data volume of the valid data in each segment at the current time and the predicted value of the variation of the valid data in each segment to obtain a predicted value of the valid data.

The determining, according to the predicted value of the first data in each segment, a segment whose garbage data needs to be collected includes determining, in ascending order of the predicted values of the valid data, the segment whose garbage data needs to be collected.

Figure 3:
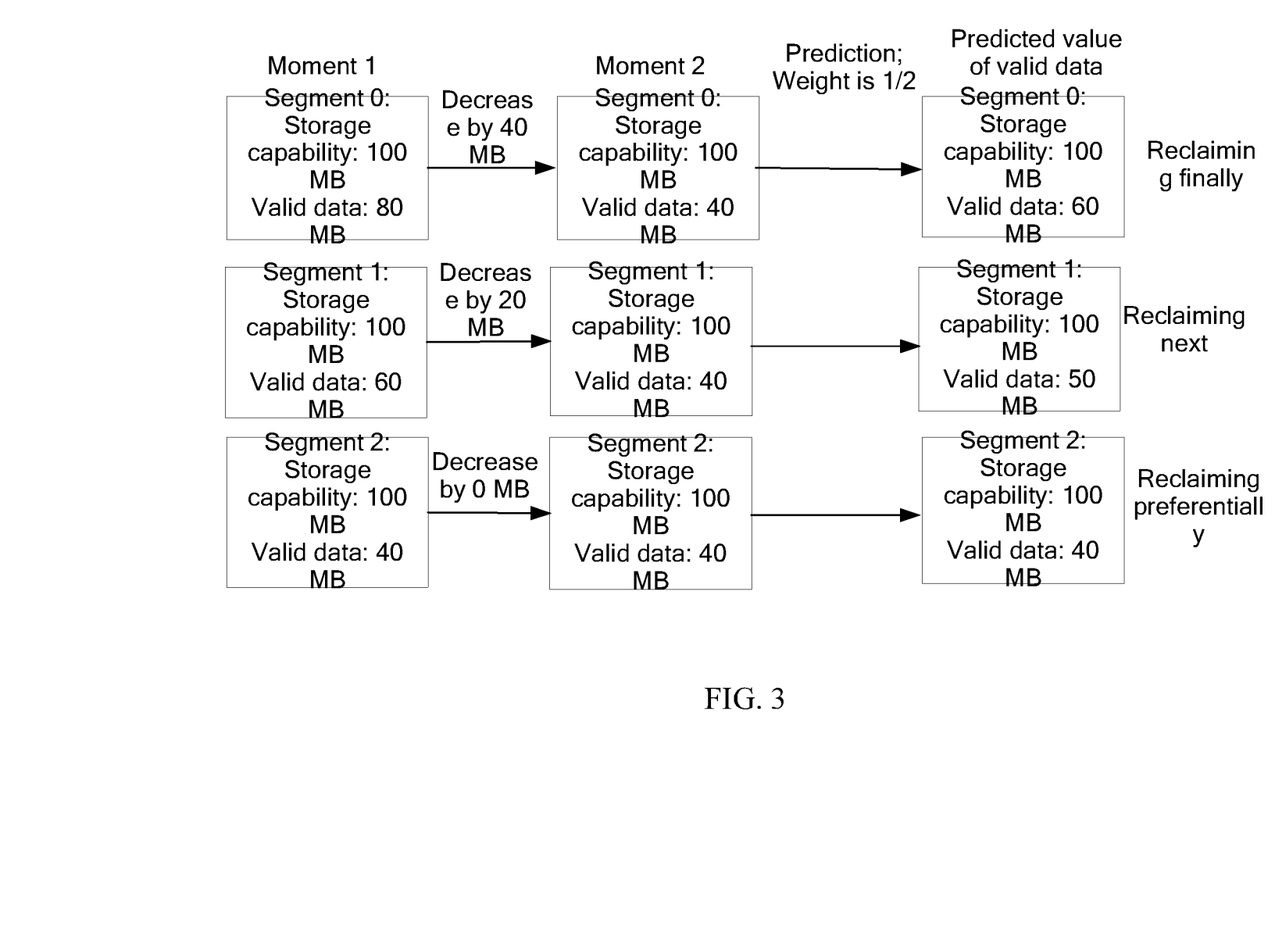
FIG. 3 is a flowchart of a method for collecting garbage data according to Embodiment 2 of the present disclosure.

FIG. 3 is a flowchart of a method for collecting garbage data according to Embodiment 2 of the present disclosure. As shown in FIG. 3, it is assumed that there are three segments that need to be collected in a storage device, where a total storage capacity of a segment 0 at a moment 1 is 100 MB, valid data is 80 MB, and garbage data is 20 MB; a total storage capacity of a segment 1 at the moment 1 is 100 MB, valid data is 60 MB, and garbage data is 40 MB; a total storage capacity of a segment 2 at the moment 1 is 100 MB, valid data is 40 MB, and garbage data is 60 MB; a total storage capacity of the segment 0 at a moment 2 is 100 MB, valid data is 40 MB, and garbage data is 60 MB; a total storage capacity of the segment 1 at the moment 2 is 100 MB, valid data is 40 MB, and garbage data is 60 MB; and a total storage capacity of the segment 2 at the moment 2 is 100 MB, valid data is 40 MB, and garbage data is 60 MB.

It is assumed that a first weight is 1 and a second weight is ½, and then a predicted value of the valid data in each segment is obtained by means of calculation according to a decrement of the valid data in each segment from the moment 1 to the moment 2. A decrement of the valid data in the segment 0 from the moment 1 to the moment 2 is 40 MB, and a predicted value, which is obtained by multiplying 40 MB by the weight ½, of the valid data in the segment 0 is 20 MB; a decrement of the valid data in the segment 1 from the moment 1 to the moment 2 is 20 MB, and a predicted value, which is obtained by multiplying 20 MB by the weight ½, of the valid data in the segment 1 is 10 MB; and a decrement of the valid data in the segment 2 from the moment 1 to the moment 2 is 0, and a predicted value of the valid data in the segment 2 is 0.

According to the foregoing data, the predicted value of the valid data in the segment 0 may be obtained by means of calculation according to volume of valid data×first weight+variation of valid data×second weight, that is, 40 MB×1+40 MB×½=60 MB; the predicted value of the valid data in the segment 1 may be obtained by means of calculation according to volume of valid data×first weight+variation of valid data×second weight, that is, 40 MB×1+20 MB×½=50 MB; and the predicted value of the valid data in the segment 2 may be obtained by means of calculation according to volume of valid data×first weight+variation of valid data×second weight, that is, 40 MB×1+0 MB×½=40 MB.

A segment whose garbage data needs to be collected is determined in ascending order of a predicted value of valid data; therefore, the garbage data in the segment 2 is collected preferentially, then the garbage data in the segment 1 is collected, and finally the garbage data in the segment 0 is collected.

Optionally, the separately recording a data volume of first data in each segment of a storage device at a current time and a variation of the first data in each segment of the storage device in a preset period of time before the current time includes separately recording a data volume of garbage data in each segment at the current time and a decrement of valid data in each segment in the preset period of time before the current time.

The obtaining, by means of calculation, a predicted value of the first data according to the data volume of the first data in each segment and the variation of the first data in each segment includes obtaining, by means of calculation, a predicted value of the data volume of the garbage data at the current time according to the first weight and the data volume of the garbage data in each segment at the current time; obtaining, by means of calculation, a predicted value of a variation of the valid data according to the second weight and the decrement of the valid data in each segment; and subtracting the predicted value of the variation of the valid data in each segment from the predicted value of the data volume of the garbage data in each segment at the current time to obtain a predicted value of the garbage data.

The determining, according to the predicted value of the first data in each segment, a segment whose garbage data needs to be collected includes determining, in descending order of the predicted values of the garbage data, the segment whose garbage data needs to be collected.

Optionally, the separately recording a data volume of first data in each segment of a storage device at a current time and a variation of the first data in each segment of the storage device in a preset period of time before the current time includes separately recording a data volume of valid data in each segment at the current time and an increment of garbage data in each segment in the preset period of time before the current time.

The obtaining, by means of calculation, a predicted value of the first data according to the data volume of the first data in each segment and the variation of the first data in each segment includes obtaining, by means of calculation, a predicted value of the data volume of the valid data at the current time according to the first weight and the data volume of the valid data in each segment at the current time; obtaining, by means of calculation, a predicted value of a variation of the garbage data according to the second weight and the increment of the garbage data in each segment; and adding the predicted value of the data volume of the valid data in each segment at the current time and the predicted value of the variation of the garbage data in each segment to obtain a predicted value of the valid data.

The determining, according to the predicted value of the first data in each segment, a segment whose garbage data needs to be collected includes determining, in ascending order of the predicted values of the valid data, the segment whose garbage data needs to be collected.

According to the method for collecting garbage data provided in this embodiment of the present disclosure, a data volume of first data in each segment of a storage device at a current time and a variation of the first data in each segment of the storage device in a preset period of time before the current time are separately recorded, where the first data is garbage data or valid data, the variation of the first data is an increment of the garbage data or a decrement of the valid data, and a value of the increment of the garbage data is the same as a value of the decrement of the valid data; a predicted value of the first data is obtained by means of calculation according to the data volume of the first data in each segment and the variation of the first data in each segment; and a segment whose garbage data needs to be collected is determined according to the predicted value of the first data in each segment. A segment that has more garbage data and whose garbage creating rate is lower is reclaimed preferentially, thereby improving efficiency of garbage data collection.

Figure 4:
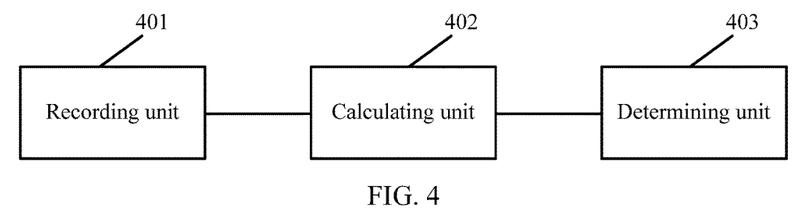
FIG. 4 is a structural diagram of a storage device for collecting garbage data according to an embodiment of the present disclosure.

Referring to FIG. 4, FIG. 4 is a structural diagram of a storage device for collecting garbage data according to an embodiment of the present disclosure. The storage device includes a recording unit 401, a calculating unit 402, and a determining unit 403.

The recording unit 401 is configured to separately record a data volume of first data in each segment at a current time and a variation of the first data in each segment in a preset period of time before the current time, where the first data is garbage data or valid data, the variation of the first data is an increment of the garbage data or a decrement of the valid data, and a value of the increment of the garbage data is the same as a value of the decrement of the valid data.

The valid data refers to data stored at a physical address that is in a segment and has a mapping relationship with a logical address, and the garbage data refers to data stored at a physical address that is in a segment and does not have a mapping relationship with a logical address.

There are two data addresses in a storage device that uses a redirect-on-write, which are a logical address and a physical address. There is a mapping table between the logical address and the physical address, which is used to record a mapping relationship between the logical address and the physical address. After the storage device using the redirect-on-write receives a write IO, the write IO carries a logical address. When data is written into the logical address for the first time, a new physical address is allocated from a physical space of the storage device, the data is written into the new physical address, and a mapping relationship between the logical address and the new physical address is established in the mapping table. When data is written into the same logical address for the second time, another new physical address is allocated from the physical space, the data is written into the other new physical address, and a mapping relationship between the logical address and the other new physical address is established in the mapping table. The data stored at the other new physical address is valid data, and the data stored at the original physical address becomes garbage data. To reclaim a segment, garbage data does not need to be migrated, but only valid data needs to be migrated.

The calculating unit 402 is configured to obtain, by means of calculation, a predicted value of the first data according to the data volume of the first data in each segment and the variation of the first data in each segment.

Optionally, the calculating unit 402 is configured to obtain, by means of calculation, a predicted value of the data volume of the first data according to a first weight and the data volume of the first data in each segment; obtain, by means of calculation, a predicted value of the variation of the first data according to a second weight and the variation of the first data in each segment; and obtain, by means of calculation, the predicted value of the first data according to the predicted value of the data volume of the first data and the predicted value of the variation of the first data.

It is assumed that the first data in each segment at the current time is garbage data, the first weight is ½, the variation of the first data in each segment is a variation of the garbage data, and the second weight is ⅓. According to a principle that a segment that has more garbage data is reclaimed preferentially, a larger product obtained by multiplying a volume of the garbage data by the first weight indicates more garbage data and less valid data in the segment, and a smaller volume of valid data to be migrated during the reclaiming, and therefore the segment is reclaimed preferentially; and a larger product obtained by multiplying a variation of the garbage data by the second weight indicates a larger increment of the garbage data in the segment, and postponed reclaiming enables more garbage to be further created in the segment, and therefore the segment is reclaimed later. In comprehensive consideration of these two factors, an expression may be:

Volume of garbage data×First weight−Variation of garbage data×Second weight.

It is assumed that the first data in each segment at the current time is valid data, the first weight is ½, the variation of the first data is a variation of the valid data, and the second weight is ⅓. According to a principle that a segment that has less valid data is reclaimed preferentially, a smaller product obtained by multiplying a volume of the valid data by the first weight indicates less valid data, and a smaller volume of valid data to be migrated during the reclaiming, and therefore the segment is reclaimed preferentially; and a smaller product obtained by multiplying a variation of the valid data by the second weight indicates a smaller increment of the garbage data, and therefore the segment is reclaimed earlier. In comprehensive consideration of these two factors, an expression may be:

Volume of valid data×First weight−Variation of valid data×Second weight.

The determining unit 403 is configured to determine, according to the predicted value of the first data in each segment, a segment whose garbage data needs to be collected.

Optionally, the recording unit 401 is configured to separately record a data volume of garbage data in each segment at the current time and an increment of the garbage data in each segment in the preset period of time before the current time.

The calculating unit 402 is configured to obtain, by means of calculation, a predicted value of the data volume of the garbage data at the current time according to the first weight and the data volume of the garbage data in each segment at the current time; obtain, by means of calculation, a predicted value of a variation of the garbage data according to the second weight and the increment of the garbage data in each segment; and subtract the predicted value of the variation of the garbage data in each segment from the predicted value of the data volume of the garbage data in each segment at the current time to obtain a predicted value of the garbage data.

The determining unit 403 is configured to determine, in descending order of the predicted values of the garbage data, the segment whose garbage data needs to be collected.

For an implementation manner of this storage device embodiment of the present disclosure, reference may be made to the foregoing description of FIG. 2.

Optionally, the recording unit 401 is configured to separately record a data volume of valid data in each segment at the current time and a decrement of the valid data in each segment in the preset period of time before the current time.

The calculating unit 402 is configured to obtain, by means of calculation, a predicted value of the data volume of the valid data at the current time according to the first weight and the data volume of the valid data in each segment at the current time; obtain, by means of calculation, a predicted value of a variation of the valid data according to the second weight and the decrement of the valid data in each segment; and add the predicted value of the data volume of the valid data in each segment at the current time and the predicted value of the variation of the valid data in each segment to obtain a predicted value of the valid data.

The determining unit 403 is configured to determine, in ascending order of the predicted values of the valid data, the segment whose garbage data needs to be collected.

For an implementation manner of this storage device embodiment of the present disclosure, reference may be made to the foregoing description of FIG. 3.

Optionally, the recording unit 401 is configured to separately record a data volume of garbage data in each segment at the current time and a decrement of valid data in each segment in the preset period of time before the current time.

The calculating unit 402 is configured to obtain, by means of calculation, a predicted value of the data volume of the garbage data at the current time according to the first weight and the data volume of the garbage data in each segment at the current time; obtain, by means of calculation, a predicted value of a variation of the valid data according to the second weight and the decrement of the valid data in each segment; and subtract the predicted value of the variation of the valid data in each segment from the predicted value of the data volume of the garbage data in each segment at the current time to obtain a predicted value of the garbage data.

The determining unit 403 is configured to determine, in descending order of the predicted values of the garbage data, the segment whose garbage data needs to be collected.

Optionally, the recording unit 401 is configured to separately record a data volume of valid data in each segment at the current time and an increment of garbage data in each segment in the preset period of time before the current time.

The calculating unit 402 is configured to obtain, by means of calculation, a predicted value of the data volume of the valid data at the current time according to the first weight and the data volume of the valid data in each segment at the current time; obtain, by means of calculation, a predicted value of a variation of the garbage data according to the second weight and the increment of the garbage data in each segment; and add the predicted value of the data volume of the valid data in each segment at the current time and the predicted value of the variation of the garbage data in each segment to obtain a predicted value of the valid data.

The determining unit 403 is configured to determine, in ascending order of the predicted values of the valid data, the segment whose garbage data needs to be collected.

According to the storage device for collecting garbage data provided in this embodiment of the present disclosure, the storage device separately records a data volume of first data in each segment of the storage device at a current time and a variation of the first data in each segment of the storage device in a preset period of time before the current time, where the first data is garbage data or valid data, the variation of the first data is an increment of the garbage data or a decrement of the valid data, and a value of the increment of the garbage data is the same as a value of the decrement of the valid data; obtains, by means of calculation, a predicted value of the first data according to the data volume of the first data in each segment and the variation of the first data in each segment; and determines, according to the predicted value of the first data in each segment, a segment whose garbage data needs to be collected. A segment that has more garbage data and whose garbage creating rate is lower is reclaimed preferentially, thereby improving efficiency of garbage data collection.

Figure 5:
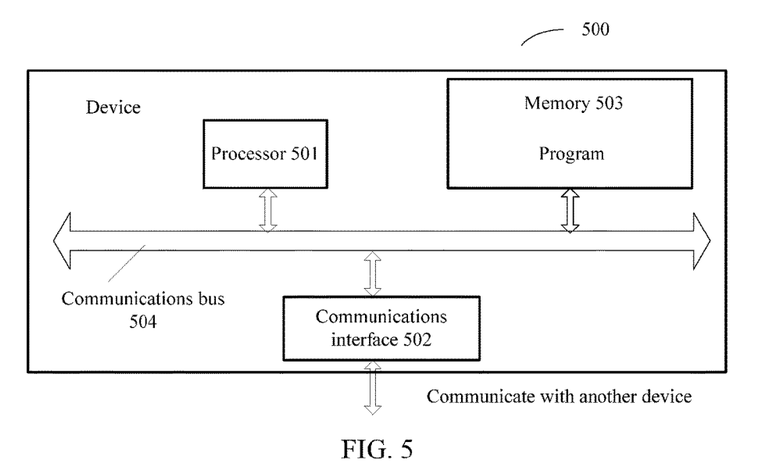
FIG. 5 is a structural diagram of a storage device according to an embodiment of the present disclosure.

FIG. 5 is an apparatus structural diagram of a storage device according to an embodiment of the present disclosure. Referring to FIG. 5, FIG. 5 shows a storage device 500 according to this embodiment of the present disclosure, and implementation of the storage device is not limited in a specific embodiment of the present disclosure. The storage device 500 includes a processor 501, a communications interface 502, a memory 503, and a bus 504.

The processor 501, the communications interface 502, and the memory 503 complete mutual communication using the bus 504.

The communications interface 502 is configured to communicate with another device.

The processor 501 is configured to execute a program.

The program may include program code, where the program code includes a computer operation instruction.

The processor 501 may be a central processing unit (CPU), or an application-specific integrated circuit (ASIC), or one or more integrated circuits configured to implement the embodiments of the present disclosure.

The memory 503 is configured to store the program. The memory 503 may be a volatile memory, for example, a random access memory (RAM), or a nonvolatile memory, for example, a read-only memory (ROM), a flash memory, an HDD, or an SSD. The processor 501 executes, according to a program instruction stored in the memory 503, the following method: separately recording a data volume of first data in each segment of a storage device at a current time and a variation of the first data in each segment of the storage device in a preset period of time before the current time, where the first data is garbage data or valid data, the variation of the first data is an increment of the garbage data or a decrement of the valid data, and a value of the increment of the garbage data is the same as a value of the decrement of the valid data; obtaining, by means of calculation, a predicted value of the first data according to the data volume of the first data in each segment and the variation of the first data in each segment; and determining, according to the predicted value of the first data in each segment, a segment whose garbage data needs to be collected.

The valid data refers to data stored at a physical address that is in a segment and has a mapping relationship with a logical address, and the garbage data refers to data stored at a physical address that is in a segment and does not have a mapping relationship with a logical address.

The obtaining, by means of calculation, a predicted value of the first data according to the data volume of the first data in each segment and the variation of the first data in each segment includes obtaining, by means of calculation, a predicted value of the data volume of the first data according to a first weight and the data volume of the first data in each segment; obtaining, by means of calculation, a predicted value of the variation of the first data according to a second weight and the variation of the first data in each segment; and obtaining, by means of calculation, the predicted value of the first data according to the predicted value of the data volume of the first data and the predicted value of the variation of the first data.

The separately recording a data volume of first data in each segment of a storage device at a current time and a variation of the first data in each segment of the storage device in a preset period of time before the current time includes separately recording a data volume of garbage data in each segment at the current time and an increment of the garbage data in each segment in the preset period of time before the current time.

The obtaining, by means of calculation, a predicted value of the first data according to the data volume of the first data in each segment and the variation of the first data in each segment includes obtaining, by means of calculation, a predicted value of the data volume of the garbage data at the current time according to the first weight and the data volume of the garbage data in each segment at the current time; obtaining, by means of calculation, a predicted value of a variation of the garbage data according to the second weight and the increment of the garbage data in each segment; and subtracting the predicted value of the variation of the garbage data in each segment from the predicted value of the data volume of the garbage data in each segment at the current time to obtain a predicted value of the garbage data.

The determining, according to the predicted value of the first data in each segment, a segment whose garbage data needs to be collected includes determining, in descending order of the predicted values of the garbage data, the segment whose garbage data needs to be collected.

The separately recording a data volume of first data in each segment of a storage device at a current time and a variation of the first data in each segment of the storage device in a preset period of time before the current time includes separately recording a data volume of valid data in each segment at the current time and a decrement of the valid data in each segment in the preset period of time before the current time.

The obtaining, by means of calculation, a predicted value of the first data according to the data volume of the first data in each segment and the variation of the first data in each segment includes obtaining, by means of calculation, a predicted value of the data volume of the valid data at the current time according to the first weight and the data volume of the valid data in each segment at the current time; obtaining, by means of calculation, a predicted value of a variation of the valid data according to the second weight and the decrement of the valid data in each segment; and adding the predicted value of the data volume of the valid data in each segment at the current time and the predicted value of the variation of the valid data in each segment to obtain a predicted value of the valid data.

The determining, according to the predicted value of the first data in each segment, a segment whose garbage data needs to be collected includes determining, in ascending order of the predicted values of the valid data, the segment whose garbage data needs to be collected.

For the storage device for collecting garbage data provided in this embodiment of the present disclosure, reference may be made to the descriptions of the foregoing method embodiment and storage device embodiment, and details are not described herein.

According to the storage device for collecting garbage data provided in this embodiment of the present disclosure, the storage device separately records a data volume of first data in each segment of the storage device at a current time and a variation of the first data in each segment of the storage device in a preset period of time before the current time, where the first data is garbage data or valid data, the variation of the first data is an increment of the garbage data or a decrement of the valid data, and a value of the increment of the garbage data is the same as a value of the decrement of the valid data; obtains, by means of calculation, a predicted value of the first data according to the data volume of the first data in each segment and the variation of the first data in each segment; and determines, according to the predicted value of the first data in each segment, a segment whose garbage data needs to be collected. A segment that has more garbage data and whose garbage creating rate is lower is reclaimed preferentially, thereby improving efficiency of garbage data collection.

What is claimed is:

1. A method for collecting garbage data in a storage device, the storage device comprising a first segment and a second segment, and the method comprising:
   obtaining a first data volume of garbage data in the first segment and a second data volume of garbage data in the second segment at a current time separately;
   obtaining a first variation of garbage data in the first segment and a second variation of garbage data in the second segment separately in a preset period of time before the current time, the first variation of garbage data in the first segment comprising an increment of the garbage data in the first segment in the preset period of time, the second variation of garbage data in the second segment comprising an increment of the garbage data in the second segment in the preset period of time, and the garbage data comprising data stored at a physical address in the first segment or the second segment that does not have a mapping relationship with a logical address;
   obtaining a first predicted value of garbage data in the first segment according to the first data volume and the first variation, the first predicted value of garbage data in the first segment being calculated according to an equation:

$$PV1 = \text{volume of garbage data} \times \text{first weight} - \text{variation of garbage data} \times \text{second weight},$$

PV1 being the predicted value of garbage data in the first segment, the volume of garbage data being the first data volume of garbage data in the first segment, the first weight being a first preset value that is between zero and one, the variation of garbage data being the variation of garbage data in the first segment, the second weight being a second preset value that is between zero and one, and the first weight being greater than the second weight;
   obtaining a second predicted value of garbage data in the second segment according to the second data volume and the second variation;
   determining, according to the first predicted value of the garbage data in the first segment and the second predicted value of the garbage data in the second segment, a segment from the first segment and the second segment whose garbage data needs to be collected; and
   collecting the garbage data in the storage device according to the segment determined from the first segment and the second segment whose garbage data needs to be collected.

2. The method of claim 1, wherein obtaining the first predicted value of the garbage data in the first segment and the second predicted value of the garbage data in the second segment comprises:
   obtaining a first predicted value of the first data volume according to the first weight and the first data volume;
   obtaining a second predicted value of the second data volume according to the first weight and the second data volume;
   obtaining a first predicted value of the first variation according to the second weight and the first predicted value of the first data volume;
   obtaining a second predicted value of the second variation according to the second weight and the second predicted value of the second data volume;
   obtaining the first predicted value of the garbage data in the first segment according to the first predicted value of the first data volume and the first predicted value of the first variation; and
   obtaining the second predicted value of the garbage data in the second segment according to the second predicted value of the second data volume and the second predicted value of the second variation.

3. The method of claim 2, wherein obtaining the first predicted value of the garbage data in the first segment according to the first predicted value of the first data volume and the first predicted value of the first variation, and obtaining the second predicted value of the garbage data in the second segment according to the second predicted value of the second data volume and the second predicted value of the second variation comprises:
   subtracting the first predicted value of the first variation from the first predicted value of the first data volume to obtain the first predicted value of the garbage data in the first segment; and subtracting the second predicted value of the second variation from the second predicted value of the second data volume to obtain the second predicted value of the garbage data in the second segment.

4. The method of claim 1, wherein determining the segment comprises determining, in descending order of the first predicted value of the garbage data in the first segment and the second predicted value of the garbage data in the second segment, a segment from the first segment and the second segment whose garbage data needs to be collected.

5. A storage device, comprising:
a first segment;
a second segment;
a memory configured to store instructions; and
a processor coupled to the memory and configured to execute the instructions to perform steps of:
    obtaining a first data volume of garbage data in the first segment and a second data volume of garbage data in the second segment at a current time separately;
    obtaining a first variation of garbage data in the first segment and a second variation of garbage data in the second segment separately in a preset period of time before the current time, the first variation of garbage data in the first segment comprising an increment of the garbage data in the first segment in the preset period of time, the second variation of garbage data in the second segment comprising an increment of the garbage data in the second segment in the preset period of time, and the garbage data comprising data stored at a physical address in the first segment or the second segment that does not have a mapping relationship with a logical address;
    obtaining a first predicted value of garbage data in the first segment according to the first data volume and the first variation, the first predicted value of garbage data in the first segment being calculated according to an equation:

$$PV1 = \text{volume of garbage data} \times \text{first weight} - \text{variation of garbage data} \times \text{second weight},$$

PV1 being the predicted value of garbage data in the first segment, the volume of garbage data being the first data volume of garbage data in the first segment, the first weight being a first preset value that is between zero and one, the variation of garbage data being the variation of garbage data in the first segment, the second weight being a second preset value that is between zero and one, and the first weight being greater than the second weight;
    obtaining a second predicted value of garbage data in the second segment according to the second data volume and the second variation;
    determining, according to the first predicted value of the garbage data in the first segment and the second predicted value of the garbage data in the second segment, a segment from the first segment and the second segment whose garbage data needs to be collected; and
    collecting the garbage data in the storage device according to the segment determined from the first segment and the second segment whose garbage data needs to be collected.

6. The storage device of claim 5, wherein obtaining the first predicted value of the garbage data in the first segment and obtaining the second predicted value of the garbage data in the second segment comprises:
    obtaining a first predicted value of the first data volume according to the first weight and the first data volume;
    obtaining a second predicted value of the second data volume according to the first weight and the second data volume;
    obtaining a first predicted value of the first variation according to the second weight and the first predicted value of the first data volume;
    obtaining a second predicted value of the second variation according to the second weight and the second predicted value of the second data volume;
    obtaining the first predicted value of the garbage data in the first segment according to the first predicted value of the first data volume and the first predicted value of the first variation; and
    obtaining the second predicted value of the garbage data in the second segment according to the second predicted value of the second data volume and the second predicted value of the second variation.

7. The storage device of claim 6, wherein obtaining the first predicted value of the garbage data in the first segment according to the first predicted value of the first data volume and the first predicted value of the first variation, and obtaining the second predicted value of the garbage data in the second segment according to the second predicted value of the second data volume and the second predicted value of the second variation comprises:
    subtracting the first predicted value of the first variation from the first predicted value of the first data volume to obtain the first predicted value of the garbage data in the first segment; and
    subtracting the second predicted value of the second variation from the second predicted value of the second data volume to obtain the second predicted value of the garbage data in the second segment.

8. The storage device of claim 5, wherein determining the segment comprises determining, in descending order of the first predicted value of the garbage data in the first segment and the second predicted value of the garbage data in the second segment, a segment from the first segment and the second segment whose garbage data needs to be collected.

9. The method of claim 1, wherein a segment that has more garbage and whose garbage creating rate is lower is reclaimed preferentially, thereby improving efficiency of garbage data collection.

10. The method of claim 1, wherein the storage device comprises a redundant array of inexpensive disks, and each segment comprises an entire stripe.

11. The method of claim 1, wherein the storage device comprises a solid state drive, and each segment comprises an erasable block.

12. The method of claim 11, further comprising performing an erasing operation before the garbage data is collected.

13. The method of claim 1, further comprising reclaiming segments by migrating valid data.

14. The storage device of claim 5, wherein a segment that has more garbage and whose garbage creating rate is lower is reclaimed preferentially, thereby improving efficiency of garbage data collection.

15. The storage device of claim 5, wherein the storage device comprises a redundant array of inexpensive disks, and each segment comprises an entire stripe.

16. The storage device of claim 5, wherein the storage device comprises a solid state drive, and each segment comprises an erasable block.

17. The storage device of claim 16, wherein the processor is further configured to execute the instructions to perform an erasing operation before the garbage data is collected.

18. The storage device of claim 5, wherein the processor is further configured to execute the instructions to reclaim segments by migrating valid data.

\* \* \* \* \*